United States Patent
Daniel et al.

[11] Patent Number: 5,823,611
[45] Date of Patent: Oct. 20, 1998

[54] HEADLINER WITH INTEGRAL IMPACT ABSORPTION PANELS

[75] Inventors: Jeffrey A. Daniel; Brian L. Erickson, both of Holland, Mich.

[73] Assignee: Prince Corporation, Holland, Mich.

[21] Appl. No.: 529,366

[22] Filed: Sep. 18, 1995

[51] Int. Cl.⁶ .................................................. B60R 13/02
[52] U.S. Cl. .......................... 296/214; 296/189; 280/751
[58] Field of Search .................................. 296/214, 39.1, 296/189; 280/751

[56] References Cited

U.S. PATENT DOCUMENTS

| | | |
|---|---|---|
| 2,791,527 | 5/1957 | Gawrysiak . |
| 3,345,245 | 10/1967 | Hanusa . |
| 3,396,070 | 8/1968 | Gambill et al. . |
| 3,433,526 | 3/1969 | Field et al. . |
| 3,447,199 | 6/1969 | Trimble . |
| 3,638,992 | 2/1972 | Forshee . |
| 3,647,588 | 3/1972 | Greig . |
| 4,020,207 | 4/1977 | Alfter et al. . |
| 4,077,821 | 3/1978 | Doerfling . |
| 4,119,749 | 10/1978 | Roth et al. . |
| 4,131,702 | 12/1978 | Alfter et al. . |
| 4,214,788 | 7/1980 | Srock . |
| 4,256,797 | 3/1981 | Stamper et al. . |
| 4,352,522 | 10/1982 | Miller . |
| 4,600,621 | 7/1986 | Maurer et al. . |
| 4,718,714 | 1/1988 | Tanino et al. ............................ 296/214 |
| 4,828,910 | 5/1989 | Haussling . |
| 4,958,878 | 9/1990 | Kempkers . |
| 4,978,407 | 12/1990 | Ardissone . |
| 5,007,976 | 4/1991 | Satterfield et al. . |
| 5,108,147 | 4/1992 | Grimm et al. . |
| 5,186,517 | 2/1993 | Gilmore et al. . |
| 5,275,865 | 1/1994 | Nicolay . |
| 5,280,991 | 1/1994 | Weiland ................................ 296/214 |

FOREIGN PATENT DOCUMENTS

| | | |
|---|---|---|
| 2828141 | 1/1979 | Netherlands . |
| 1223598 | 2/1971 | United Kingdom . |

*Primary Examiner*—Joseph D. Pape
*Attorney, Agent, or Firm*—Price, Heneveld, Cooper, DeWitt & Litton

[57] ABSTRACT

A headliner includes one or more integrally formed flaps extending from an edge of the headliner and integrally hinged to the edge of the headliner to fold over the top of the headliner and be concealed in the area between the headliner and vehicle sheet metal roof. In one embodiment of the invention, the panel defining flaps are formed of a pleated headliner material to provide a crushable impact absorption material. In another embodiment of the invention where higher density headliner material is employed, the flaps are compressed headliner material to provide a relatively thin, high density impact absorption padding.

9 Claims, 2 Drawing Sheets

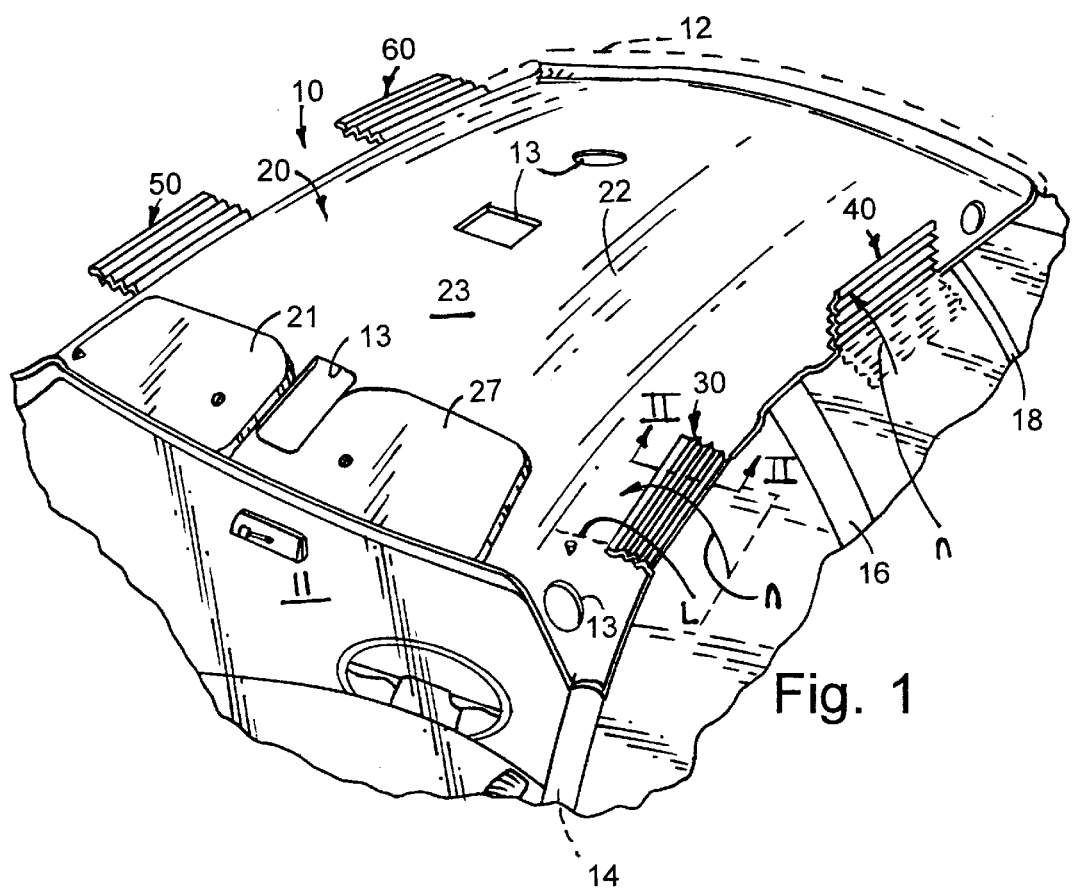
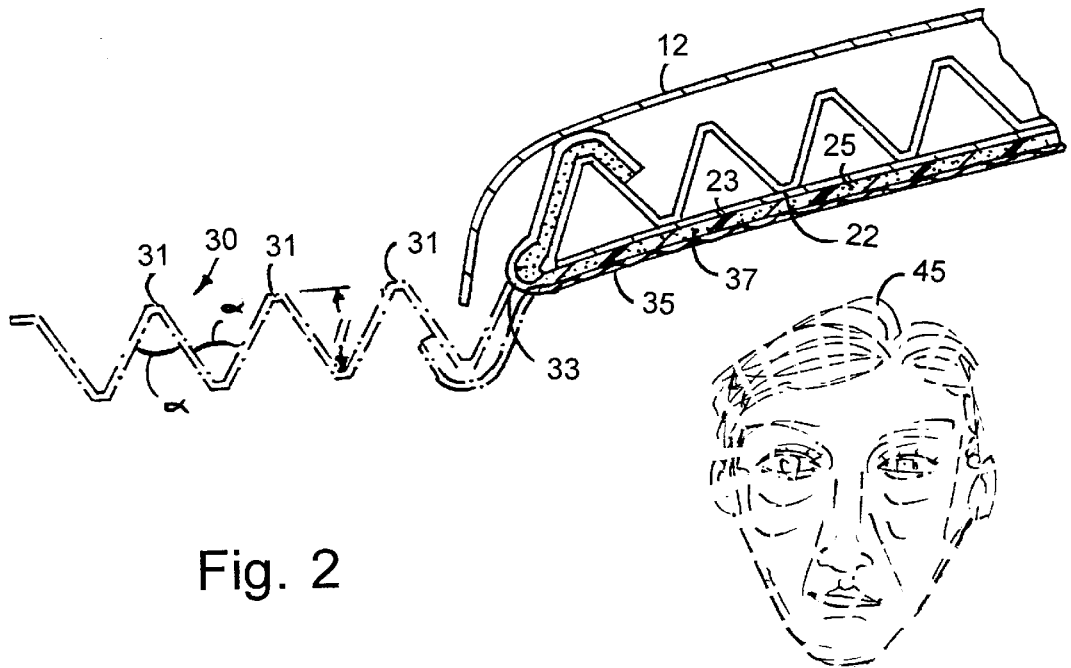

HEADLINER WITH INTEGRAL IMPACT ABSORPTION PANELS

BACKGROUND OF THE INVENTION

The present invention relates to vehicle decorative panels and particularly to a headliner with one or more integral impact absorbing panels.

In recent years, headliners for vehicles and other decorative panels have been integrally molded and have varying thicknesses depending upon the area of the headliner. In some instances, efforts have been made to increase the thicknesses of such headliners in areas where impact absorption may be important. With such increased thickness, however, the manufacture of the headliner, through a molding process, becomes increasingly complex as does the size and shape of the mold. Also, some attempts have been made to provide a safety cushioning material behind headliners in critical areas, such as the interface between the headliner and a vehicle window. Modern vehicles, however, do not allow space for significant additional padding or cushioning materials in view of the more compact interior design and sharply slanted windshields. As a result, space in the headliner area is at a minimum and conventional impact absorption cushioning is not practical.

In the past, headliners have integrally included visors which extend downwardly from the headliner and which are made as an integral part of the headliner material itself with the addition, typically, of an over center hinge for controlling the storing and use of the visor so formed. U.S. Pat. No. 4,958,878 discloses such a headliner and visor system in which the headliner includes a recessed pocket for the flush storage of such visors and, therefore, does not provide significant additional headliner material for impact absorption. Accordingly, there remains a need in modern molded headliner and other vehicle trim panel construction and design for impact absorption which can be integrally formed with the vehicle panel and which is concealed from view when assembled to provide a trim aesthetic appearance to the vehicle headliner or other panel and yet provide the additional safety of impact absorption zones where desired. This must be achieved in the relatively compact space available in current vehicle designs.

SUMMARY OF THE PRESENT INVENTION

The system of the present invention solves these problems by providing an integral headliner with impact absorption panels which are defined by integrally formed flaps extending from edges of the headliner formed at desired areas for impact absorption. The flaps are integrally hinged to the edge of the headliner and fold over the top of the headliner and are concealed in the area between the headliner and vehicle sheet metal roof when assembled. In one embodiment of the invention, the panel defining flaps are formed of a pleated headliner material to provide a crushable impact absorption material. In another embodiment of the invention where higher density headliner material is employed, the flaps are compressed headliner material itself to provide a relatively thin but high density impact absorption padding. In either embodiment of the invention, the impact absorbing panels so formed are folded over and adhered to the top surface of the headliner to not only provide the desired impact absorption characteristics in particular zones of interest but also to provide a trim appearance to the edge of the headliner where they are formed.

These and other features, objects and advantages of the present invention will become apparent upon reading the following description thereof together with reference to the accompanying drawings.

BRIEF DESCRIPTION OF THE DRAWINGS

FIG. 1 is a top perspective view of a headliner of one embodiment shown in a vehicle with its sheet metal roof shown in phantom form of the present invention;

FIG. 2 is an enlarged, fragmentary, cross-sectional view taken along section lines II—II of FIG. 1;

DETAILED DESCRIPTION OF THE PREFERRED EMBODIMENT

Figure 3:
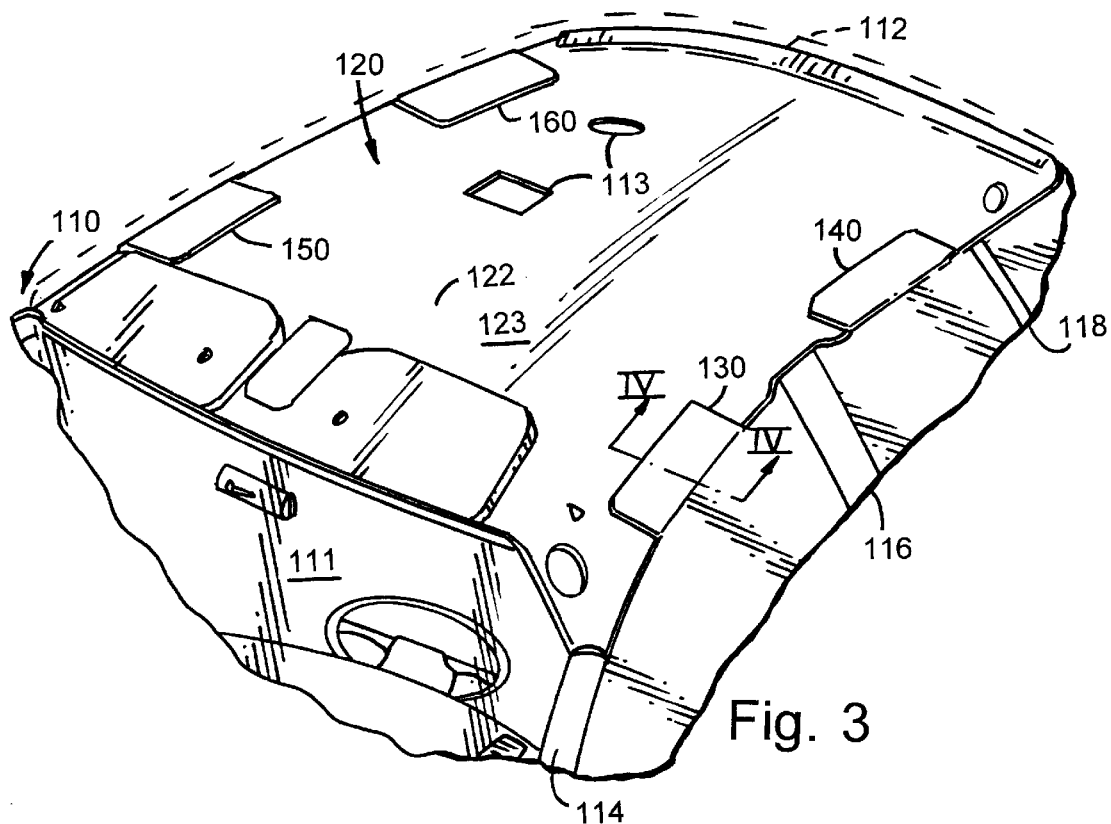
FIG. 3 is a top perspective view of a vehicle headliner and vehicle showing an alternative embodiment of the present invention.

Referring initially to FIG. 1, there is shown a vehicle 10, such as an automobile, which includes a sheet metal vehicle roof 12 shown in phantom form in FIG. 1 and in solid lines in FIG. 2 which is supported by a variety of roof pillars, such as A-pillar 14, B-pillar 16 and C-pillar 18 of the vehicle, in a conventional manner. The windshield 11 extends from the front edge of the roof 12, and an integrally molded headliner 20 is mounted to the sheet metal roof in a conventional manner, such as by suitable mounting fasteners, adhesives or the like. The headliner may include a plurality of apertures 13 for mounting lamps or other vehicle accessories (not shown) to the headliner prior to its installation in the vehicle.

In the first embodiment of the invention shown in FIGS. 1 and 2, headliner 20 integrally includes a plurality of pleated flaps 30, 40, 50 and 60. Each of the flaps are identical and are integrally formed with the body 22 of the headliner to define impact absorbing panels which are folded over and bonded to the upper surface 23 of the headliner from their originally formed position as shown by flaps 50 and 60 by pivoting in the direction indicated by arrows A on flaps 30 and 40 to their final installed position as shown in solid lines in FIG. 2. The headliner substrate 23 is covered by a decorative material including a fabric or vinyl outer layer 35 and integral foam backing material 37 bonded to the otherwise exposed surface 25 of headliner substrate 23 during the molding of the headliner.

Turning now to FIG. 2, the headliner material 22 is preferably made of a fibrous polyethylene terephthalate (PET) core utilizing fiberglass reinforcement and phenolic binder over which a PET scrim material is placed. Such a headliner is described in detail in U.S. Pat. No. 4,828,910, the disclosure of which is incorporated herein by reference. As seen in FIG. 1 and in phantom in FIG. 2, flap 30 is integrally formed with the body 22 of the headliner of the same material and includes a plurality of pleats defining lands 31 which are folded over and adhesively attached to the upper surface 23 of the headliner as seen in FIG. 2 utilizing a contact adhesive. The pleats are formed at 60° angles "α" to define equilateral triangles having a height "H" of approximately 10–25 mm in the preferred embodiment where the thickness of a headliner substrate 23 was approximately 1.5 mm. A hinge 33 is formed at the junction of flap 30 and the body 22 of the headliner by compressing the linear area long the length of the flap at its junction with the headliner body to allow its pivoting in a direction indicated by arrow A in FIG. 1 to the final assembled position where an adhesive, such as contact cement, applied to lands 31 adheres the pleated or accordion folded impact absorbing panels so defined to the top of the headliner. The impact absorbing panels so formed are located in desired areas which, as seen in FIG. 1, include the head areas above each of the side windows where the head 45 of an occupant is located.

As can be appreciated by those skilled in the art, the number of pleats defining the impact absorption panels, as well as their length "L" (FIG. 1), can be varied as desired and to conform to a particular vehicle body. In the embodiment shown in FIG. 2, for example, four such completed pleats are formed and have a length of approximately one foot, although a greater number of pleats may be employed as well as longer or shorter pleats as desired. In the headliner 20 of FIG. 1, the forward windshield area of the headliner includes recessed pockets 21 and 27 for nestably receiving visors therein. In some vehicles where visors are not recessed in such pockets, additional impact-absorbing panels can also be formed in the front or rear window areas.

Figures 4, 5:
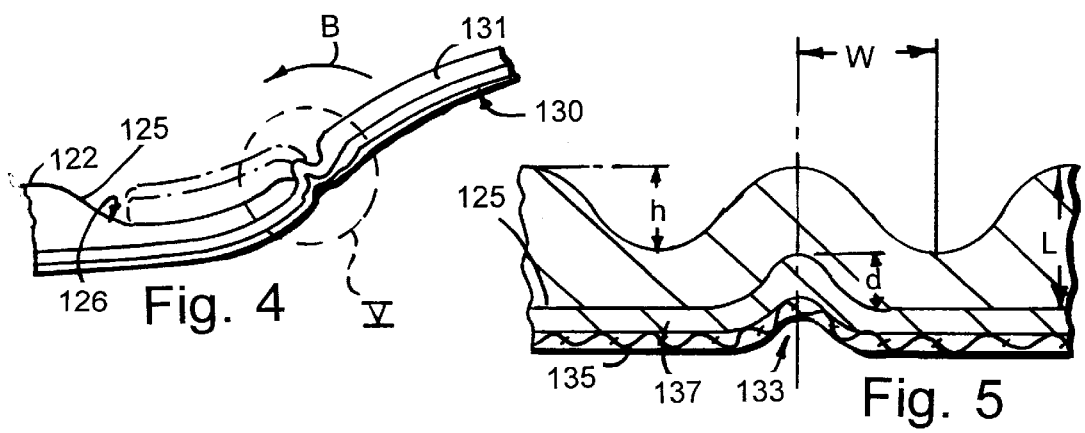
FIG. 4 is an enlarged, fragmentary, perspective view of one of the impact absorption panels taken along section line IV—IV of FIG. 3.
FIG. 5 is a greatly enlarged view of the hinge area shown by circled area V in FIG. 4.

When the headliner is made from a substantially different material, such as a thermoformable polyurethane foam core, instead of pleating the flaps defining the impact absorption panels, the panels can be integrally formed with the headliner body to provide substantially smooth compressed energy absorbing pads as shown in the embodiment shown in FIGS. 3–5. In this embodiment, a headliner 120 is shown mounted in a vehicle 110, such as an automobile, and which includes a headliner substrate 122 which is thermoformed of an open-celled semirigid polyurethane foam having a typical density of from two to four pounds per cubic foot. The headliner substrate includes fiberglass reinforcement and a thermoplastic binder, and its upper surface 123 is covered with a polyester scrim material as is conventional. Also, the lower surface 125 of the substrate is covered by a decorative upholstery including a fabric or vinyl outer layer 135 overlying an integral foam backing material 137, as best seen in FIG. 5. The thickness of the substrate 123 is substantially greater than that of the first embodiment and has a thickness in one embodiment of approximately 18 mm. The four flaps shown in FIG. 3, including flaps 130, 140, 150 and 160, comprise the same substrate material as that of the main body 122 of the headliner but which is compressed to approximately 9 mm. as best seen in FIG. 4 to provide a higher density impact absorption flap which is folded over in a direction indicated by arrow B in FIG. 4 into a pocket area 126 formed on the upper surface 125 of the headliner substrate 122 to provide a double thickness of approximately double density padding material in the desired impact absorption areas.

A hinge 133 is formed, as best seen in FIG. 5, at the junction of each of the flaps 130, 140, 150 and 160 with the main body of the headliner substrate and comprises a generally curvilinear W-shaped structure with each section having a width "W" of approximately 2 mm, a trough height H of approximately 2 mm with the hinge depth "D" being approximately 1–2 mm. The thickness T of the area immediately adjacent the hinge is approximately 4 mm. The facing surface 131 of flap 130 is adhesively bonded to the surface 125 within pocket 126 of the headliner by a contact adhesive such that the energy absorption panels which are integrally formed with the headliner are secured in place prior to installation of the headliner 120 in the vehicle 110. As with the embodiment shown in FIGS. 1 and 2, in this embodiment, the energy absorption panels so formed are concealed behind the headliner and between the headliner and the sheet metal roof of the vehicle and yet provide significant safety impact absorption characteristics for protection of the vehicle occupants. Headliner 120, as with headliner 20 depending upon the type of vehicle and its configuration may include additional impact absorption panels near the front windshield and the rear window and the width and length of the panels can be varied to accommodate individual vehicle designs.

With both embodiments of the invention, an integral headliner and impact absorption panels are formed with the panels defined by flaps integrally hinged to the edge of the headliner during the headliner molding process and subsequently folded and adhered to the upper surface of the headliner substrate to complete the assembly of the headliner and integral impact absorption areas prior to installation in the vehicle. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A decorative vehicle panel having an impact absorption panel comprising:

a decorative panel for covering a sheet metal structural member of a vehicle, said panel including an edge positioned adjacent an area which can be impacted by a vehicle occupant, said panel including a decorative outer surface and an inner surface facing the vehicle structural member;

a flap extending along said edge of said panel with a hinge joining said flap to said panel, wherein said flap is made of an accordion folded section of said decorative panel; and an adhesive holding said flap to said inner surface of said panel impact area adjacent said edge such that said impact absorbing flap is concealed between said inner surface of said decorative panel and a vehicle structural member.

2. The vehicle panel as defined in claim 1 wherein said accordion folds define equilateral triangles.

3. The vehicle panel as defined in claim 2 wherein said equilateral triangles have a height of from about 10 to 25 mm.

4. A headliner having an integral impact absorption panel comprising:

a decorative panel for covering a sheet metal roof of a vehicle, said panel including an edge positioned adjacent the vehicle roof which can be impacted by a vehicle occupant, said panel including a decorative outer surface and an inner surface facing the vehicle roof; and a flap extending along said edge of said panel with an integral hinge joining said flap to said panel to define an impact absorbing panel which can be folded over and concealed between the decorative outer surface of said decorative panel and a vehicle roof, wherein said flap is made of an accordion folded section of said decorative panel.

5. The headliner as defined in claim 4 wherein said accordion folds define equilateral triangles.

6. The headliner as defined in claim 5 wherein said equilateral triangles have a height of from about 10 to 25 mm.

7. An integral decorative vehicle panel and impact absorption panel comprising:

a decorative panel for covering a sheet metal structural member of a vehicle, said panel including an edge positioned adjacent an area which can be impacted by a vehicle occupant, said panel including a decorative outer surface and an inner surface facing the vehicle structural member;

a flap extending along said edge of said panel with an integral hinge joining said flap to said panel, wherein said flap is made of a pleated section of said decorative panel; and an adhesive holding said flap to said inner surface of said panel impact area adjacent said edge such that said impact absorbing flap is concealed between the decorative outer surface of said panel and a vehicle structural member.

8. The vehicle panel as defined in claim 7 wherein said pleated section defines equilateral triangles.

9. The vehicle panel as defined in claim 8 wherein said equilateral triangles have a height of from about 10 to 25 mm.

* * * * *